(12) United States Patent
Wang et al.

(10) Patent No.: US 8,276,130 B2
(45) Date of Patent: Sep. 25, 2012

(54) METHOD AND COMPILER OF COMPILING A PROGRAM

(75) Inventors: Wenjun Wang, Beijing (CN); Zhou Wu, Beijing (CN); Xin Zhong, Beijing (CN); Zheng Wang, Edinburgh (GB)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 12/184,557

(22) Filed: Aug. 1, 2008

(65) Prior Publication Data

US 2009/0049431 A1 Feb. 19, 2009

(30) Foreign Application Priority Data

Aug. 14, 2007 (CN) .............................. 200710141856

(51) Int. Cl.
*G06F 9/45* (2006.01)
(52) U.S. Cl. .................. 717/143; 717/140; 717/142
(58) Field of Classification Search .................. None
See application file for complete search history.

(56) References Cited

U.S. PATENT DOCUMENTS

| | | | | |
|---|---|---|---|---|
| 6,550,059 B1 * | 4/2003 | Choe et al. | ..................... | 717/159 |
| 7,191,433 B2 * | 3/2007 | Narad et al. | .................. | 717/140 |
| 7,243,343 B2 * | 7/2007 | Edwards et al. | .............. | 717/143 |
| 7,392,511 B2 * | 6/2008 | Brokenshire et al. | ......... | 717/143 |
| 7,840,954 B2 * | 11/2010 | Gschwind | ..................... | 717/159 |
| 8,010,953 B2 * | 8/2011 | Gschwind | ..................... | 717/149 |
| 8,108,846 B2 * | 1/2012 | Gschwind | ..................... | 717/149 |
| 8,136,102 B2 * | 3/2012 | Papakipos et al. | ............. | 717/140 |
| 2005/0071825 A1 * | 3/2005 | Nagaraj et al. | ................. | 717/142 |
| 2005/0132342 A1 * | 6/2005 | Van Lunteren | ............... | 717/143 |
| 2005/0144245 A1 | 6/2005 | Lowe | | |
| 2005/0273770 A1 | 12/2005 | Eichenberger et al. | | |
| 2006/0026576 A1 * | 2/2006 | Baisley et al. | ................ | 717/143 |
| 2006/0253537 A1 | 11/2006 | Thomas | | |
| 2007/0011441 A1 | 1/2007 | Eichenberger et al. | | |
| 2007/0174825 A1 * | 7/2007 | Eichenberger et al. | ....... | 717/140 |
| 2007/0192762 A1 * | 8/2007 | Eichenberger et al. | ....... | 717/159 |

FOREIGN PATENT DOCUMENTS

CN 1758222 4/2006

OTHER PUBLICATIONS

Pryanishnikov et al, Compiler Optimizations for Processors with SIMD Instructions, Software-Practice and Experience, vol. 37, Issue 1, pp. 93-115, Jan. 2007, Retrieved on [Sep. 15, 2011] Retrieved from the Internet: URL<http://onlinelibrary.wiley.com/doi/10.1002/spe.751/pdf>.*

(Continued)

*Primary Examiner* — Thuy Dao
*Assistant Examiner* — Cheneca Smith
(74) *Attorney, Agent, or Firm* — Suiter Swantz pc llo

(57) ABSTRACT

The present invention provides a method and a compiler of compiling a source program. According to an aspect of the present invention, there is provided a method of compiling a source program comprising: identifying a hint related to vector aligning when syntax analyzing said source program; and generating a simplified code based on said identified hint related to vector aligning when generating a code.

20 Claims, 2 Drawing Sheets

OTHER PUBLICATIONS

Eichenberger et al. Optimizing Compiler for the Cell Processor, 14th International Conference on Parallel Architectures and Compilation Techniques, 2005, Retrieved on [May 4, 2012] Retrieved from the Internet: URL<http://ieeexplore.ieee.org/xpls/abs_all.jsp?arnumber=1515590&tag=1>.*

Franchetti et al. Efficient Utilization of SIMD Extensions, Proceedings of the IEEE, Feb. 2005, pp. 409-425, Retrieved on [May 4, 2012] Retrieved from the Internet: URL<http://ieeexplore.ieee.org/xpls/abs_all.jsp?arnumber=1386659>.*

Alexandre E. Eichenberger, et al., Vectorization for SIMD Architectures with Alignment Constraints, Jun. 2004, Proceedings of the 2004 ACM SIGPLAN Conference on Programming Language Design and Implementation, pp. 82-93; Published in: US.

Ivan Pryanishnikov, et al., Pointer Alignment Analysis for Processors with SIMD Instruction, http://webhome.cs.uvic.ca/~nigelh/Publications/align_MSP5.pdf, 2003, In Proceedings of the 5th Workshop on Media and Streaming Processors, pp. 50-57.

* cited by examiner

METHOD AND COMPILER OF COMPILING A PROGRAM

CROSS-REFERENCE TO RELATED APPLICATIONS

The present application claims the benefit under 35 U.S.C. §119 of China; Application Serial Number 200710141856.0, filed Aug. 14, 2007 entitled "METHOD AND COMPILER OF COMPILING A PROGRAM," which is incorporated herein by reference.

TECHNICAL FIELD

The present invention relates to technology of data processing, more particularly to technology of compiling a source program.

BACKGROUND

In recent years, highly specialized embedded microprocessors, e.g.☐ Digital Signal Processors (DSPs), are required for real time processing of digitized analog signals, e.g.☐ handling audio, video, graphics and communication etc. tasks.

A typical computing scenario involves executing the same or almost the same sequence of operations on different elements of a large data set, e.g. an array. In this situation, a traditional computing model, where a single instruction (such as load, store, or integer addition) operates on a single data element, is not very efficient.

Thereby, people design and develop a Single Instruction Multiple Data (SIMD) architecture, which improves the data processing performance of a program by executing the same type computing on different data elements of a parallel vector. Most of existing high performance processors support the SIMD architecture, and these processors include a plurality of function units, some of which are configured to process scalar data, and others are combined together to process structured SIMD vector data. The SIMD architecture is generally used to process vector data for high performance computing or multimedia data types, such as color information coded by using triple (r, g, b) format, or coordinate information coded by using quadruple (x, y, z, w) format and so on.

The detailed description about the SIMD architecture can be seen in the following references 1-4:
1. "Auto-Vectorization of Interleaved Data for SIMD", Dorit Nuzman, Ira Rosen and Ayal Zaks, PLDI'06 Jun. 10-16, 2006, Ottawa, Ontario, Canada, p. 132-142 (reference 1);
2. "Vectorization for SIMD Architectures with Alignment Constraints", Alexandre E. Eichenberger, Peng Wu and Kevin O'Brien, PLDI'04, Jun. 9-11, 2004, Washington, D.C., USA, p. 82-93 (reference 2);
3. "Compilation techniques for multimedia processors", A. Krall and S. Lelait, International Journal of Parallel Programming, 28(4): 347-361, 2000 (reference 3); and
4. "Code Optimization Techniques for Embedded Processors, Methods, Algorithms, and Tools", R. Leupers, Kluwer Academic Publisher, Boston, 2000 (reference 4), which are incorporated herein by reference.

Although the SIMD architecture improves the data processing performance hugely, the SIMD architecture requires a memory address of a vector operand to be vector aligned, that is to say, requires a vector pointer to be vector aligned. Thereby, in the process of compiling a source program, whether the pointer is vector aligned or not is required to be judged before the vector operand is loaded into a register, if the pointer is not vector aligned, the pointer is required to be aligned, and the register is required to be turned (shifted) before the register loaded with the operand is operated.

Actually, most of vector pointers of SIMD instructions are vector aligned, so it is not necessary to do the above-mentioned judgment, but for a compiler, it is very difficult to determine whether the vector pointer is vector aligned or not. Thereby, for the vector, the pointer of which is vector aligned itself, many fussy and useless codes are generated in the compiling process, the complexity of the code is increased and the data processing performance of the program is decreased consequently.

SUMMARY OF THE INVENTION

In order to solve the above-mentioned problems in the prior technology, the present invention provides a method and a compiler of compiling a source program.

According to an aspect of the present invention, there is provided a method of compiling a source program comprising: identifying a hint related to vector aligning when syntax analyzing the above-mentioned source program; and generating a simplified code based on the above-mentioned identified hint related to vector aligning when generating a code.

According to another aspect of the present invention, there is provided a compiler of compiling a source program comprising: a syntax analysis unit configured to identify a hint related to vector aligning when syntax analyzing the above-mentioned source program; and a code generating unit configured to generate a simplified code based on the above-mentioned identified hint related to vector aligning when generating a code.

BRIEF DESCRIPTION OF THE DRAWINGS

It is believed that through the following detailed description of the embodiments of the present invention, taken in conjunction with the drawings, the above-mentioned features, advantages, and objectives will be better understood.

DETAILED DESCRIPTION OF THE INVENTION

Next, a detailed description of each embodiment of the present invention will be given in conjunction with the accompany drawings.

Method of Compiling a Source Program

Figure 1:
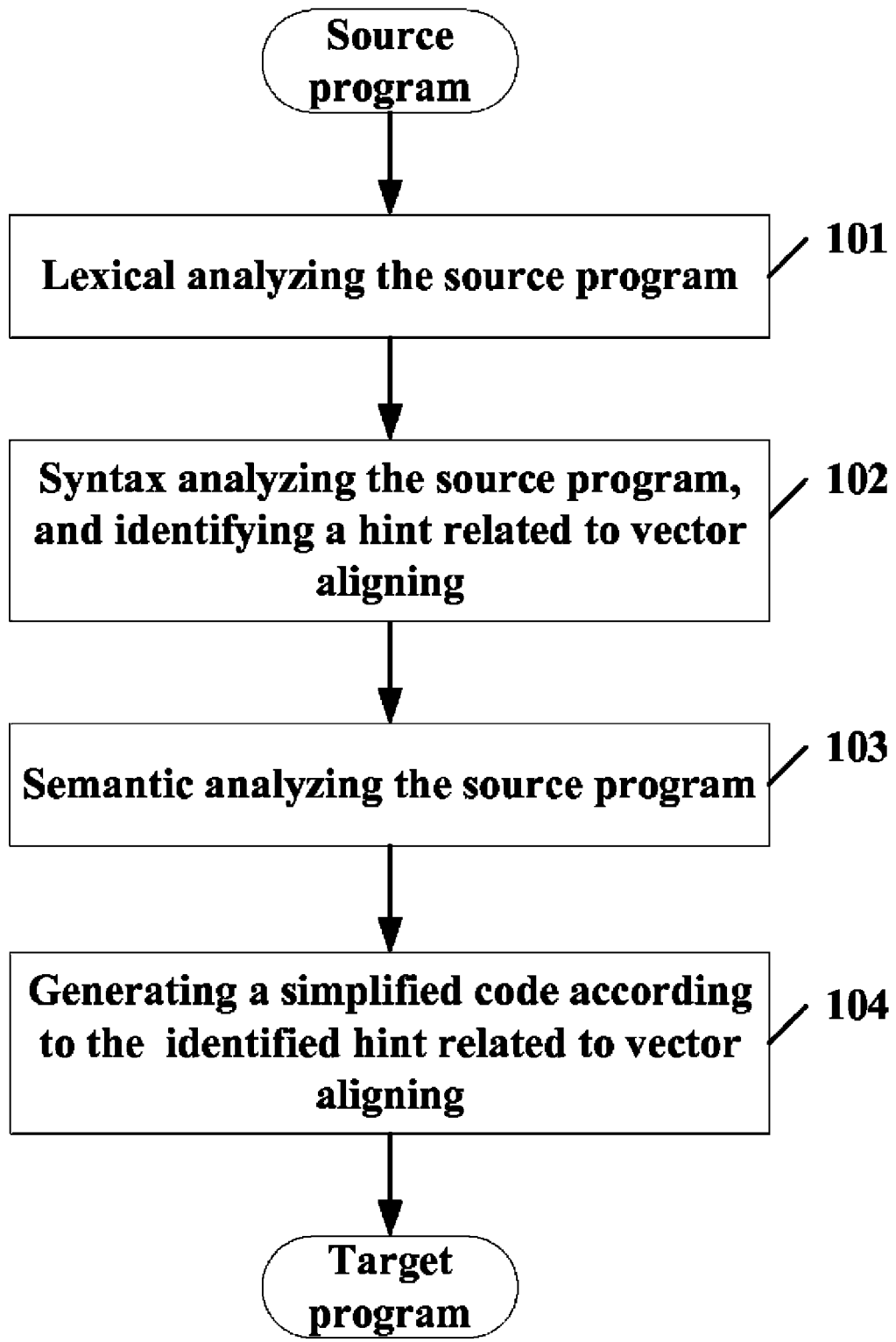
FIG. 1 is a flowchart showing a method of compiling a source program according to an embodiment of the present invention.

FIG. 1 is a flowchart showing a method of compiling a source program according to an embodiment of the present invention. As shown in FIG. 1, first at Step 101, a source program is lexical analyzed. Specifically, the source program is any program written by using a high-level language. The high-level language has no relation with specific computer hardware and is a program design language problem-objected, the expression way of which is close to a natural language and a mathematical language and is easy to be accepted and mastered by people. In this embodiment, a language for writing the source program is required to support SIMD, such as GCC (GNU), Intel/C/C++, IBM XLC, MS Visual C++ and so on.

At Step 101, the source program is lexical analyzed. As one part of a compiling process, in lexical analysis, a term such as an identifier, a constant, a reserved word and an operator etc. in the source program is constructed and analyzed, and the term in the source program is transformed into an integer or an integer pair with an internal representation equaling to a certain degree, and then transmitted as the internal representation to others part of the compiling process, for example, syntax analysis etc. Any method known in the art or developed in the future can be used to perform lexical analyzing in Step 101, and the present invention has no special limitation on this.

Next, at Step 102, the source program is syntax analyzed. As one part of the compiling process, syntax analysis is a step to identify whether each of sentences of which the program is composed is correct in syntax or not after the process of lexical analyzing the source program is completed. For a syntax error found in the analysis, an indication will be given in a way of screen displaying or words printing etc., and it is required to be modified by a programmer.

In this embodiment, a hint related to vector aligning is identified when the source program is syntax analyzed. The above-mentioned hint related to vector aligning is introduced by the programmer when writing the above-mentioned source program, and the hint is used to indicate that the vector is vector aligned. Thereby, it can be definitely known in the compiling process of the source program that the vector is a vector aligned vector. For example, a modifier "_vec_align_" can be used as the hint. Detailed description will be given later by use of an example.

At Step 102, the identified hint related to vector aligning is recorded in order to provide the indication that the vector is vector aligned at later steps. Optionally, for example, the identified hint related to vector aligning can be recorded into a symbol table as an attribute of an identifier related to the vector. In the compiling process of the source program, the symbol table is used to record identifiers in the source program and their various attributes, and these attributes can provide memory allotment information, type information, and domain information and so on of the identifiers. For a process identifier, there is also parameter information, including the number and the type of the parameter, the combination way of the actual parameter and the formal parameter and so on. The structure of the symbol table is a kind of data structure containing records, one identifier occupies one record in the symbol table generally, and the record also has a domain of recording the attribute of the identifier besides the name domain of the identifier.

Next, at Step 103, the source program is semantic analyzed based on syntax analysis. Semantic analysis is used to check if the source program contains semantic errors or not, and collect types thereof to be used at the later code generating phase. Only the source program which is syntax and semantic correct can be translated into a target code. Any method known in the art or developed in the future can be used to perform semantic analyzing in Step 103, and the present invention has no special limitation on this.

At last, at Step 104, a simplified code is generated according to the identified hint related to vector aligning at Step 102 based on semantic analysis. At this step, for the vector having the hint related to vector aligning, the code used to judge if the vector is vector aligned or not in existing technology is not required to be generated, and the code used to turn a register is also not required to be generated, thereby the code generated is hugely simplified.

In this embodiment, an operand in the vector having the above-mentioned hint related to vector aligning is only required to be directly loaded into the register by use of the simplified code generated, and the above-mentioned register loaded with the operand is directly operated, thereby the processing performance of a program is hugely improved.

Optionally, before the simplified code is generated at Step 104, a simplified intermediate code also can be generated according to the identified hint related to vector aligning at Step 102 based on semantic analysis. The intermediate code is a kind of intermediate language code between a source language and a target language. The intermediate code has various forms, for example, ternary form, quaternary form, converse Poland expression, tree structure and so on.

Further, after the simplified intermediate code is generated, the simplified intermediate code generated also can be processed and transformed in order to generate more effective target code (for example, saving time and saving space) at the last phase.

Further, optionally, in the method of compiling a source program of the embodiment, error handling also can be done. An error of the source program can be discovered at each phase of compiling the source program. After the error is discovered, there is specific processing on it generally, thus the compiling can be further continued to be executed, and the compiling will not be stopped as the error appears. For example, the word spelling error can be discovered in lexical analysis. The word string is checked if the syntax structure rule is satisfied or not in syntax analysis. The part which is syntax correct but contains meaningless operation is further found by the compiler in semantic analysis, such as adding two identifiers, one of which is array name and the other is process name, is allowed in syntax, but is not allowed in semantic. Various errors should be processed at the corresponding phase.

The method of compiling the source program of the embodiment will be further described by use of Example 1 and Comparative Example 1 in the following.

COMPARATIVE EXAMPLE 1

The source program as follows is provided to be compiled:

```
Alloc.c
struct data_blk
{
  char *ptr;
  int size;
  int gid;
  int pad;
};
struct data_blk_list
{
  struct data_blk blks[4];
  unsigned int index;
  int pad;
};
void alloc_data_block(struct data_blk_list*blk_list,
    struct data_blk*blk, int blk_num)
{
  *blk = blk_list->blks[blk_list->index];
  blk_list->index++;
  blk_list->index %= blk_list->blk_num;
}
#spu-gcc-Os-S allow.c
```

In this source program, the vectors blk_List and blk exist, and whether these vectors are vector aligned or not is not known in the compiling process. Thus, the code used to judge if the vectors are vector aligned and the code used to turn a register must be generated, and the code finally generated will occupy 54 instructions.

EXAMPLE 1

The source program as follows is provided to be compiled:

```
Alloc.c
struct data_blk
{
  char *ptr;
  int size;
  int gid;
  int pad;
};
struct data_blk_list
{
  struct data_blk blks[4];
  unsigned int index;
  int pad;
};
void alloc_data_block(struct data_blk_list*_vec_align_blk_list,
    strut data_blk*_vec_align_blk)
{
  *blk = blk_list->blks[blk_list->index];
  blk_list->index++;
  blk_list->index = 4;
}
#spu-gcc-Os-S allow.c
```

On the contrary with Comparative Example 1, a new modifier _vec_align_ is introduced by the programmer to provide the hint related to vector aligning in the source program of Example 1. For the compiler, the vectors blk_list and blk are all 16 bytes aligned in Example 1, thus,

```
void alloc_data_block(struct data_blk_list*_vec_align_blk_list,
    strut data_blk*_vec_align_blk)
{
  *blk = blk_list->blks[blk_list->index];
  blk_list->index++;
  blk_list->index = 4;
}
can be transformed into SIMD codes as follows:
void alloc_data_block(vector unsigned int *blk_list,
    vector unsigned int *blk)
{
  *blk = *(blk_list + spu_extract(blk_list[4], 0));
  blk_list [4] = spu_and(spu_add(blk_list[4], 1), 3);
}
```

Thus, the code used to judge if the vector is vector aligned and the code used to turn a register are not required to be generated, and the code finally generated will only occupy 10 instructions. Thereby the code generated is hugely simplified.

By use of the method of compiling a source program of the embodiment, a simplified target code can be generated by using the hint related to vector aligning provided in the source program, thereby the processing capability of the program is hugely improved, time and space are saved, and the efficiency is improved.

Compiler of Compiling a Source Program

Figure 2:
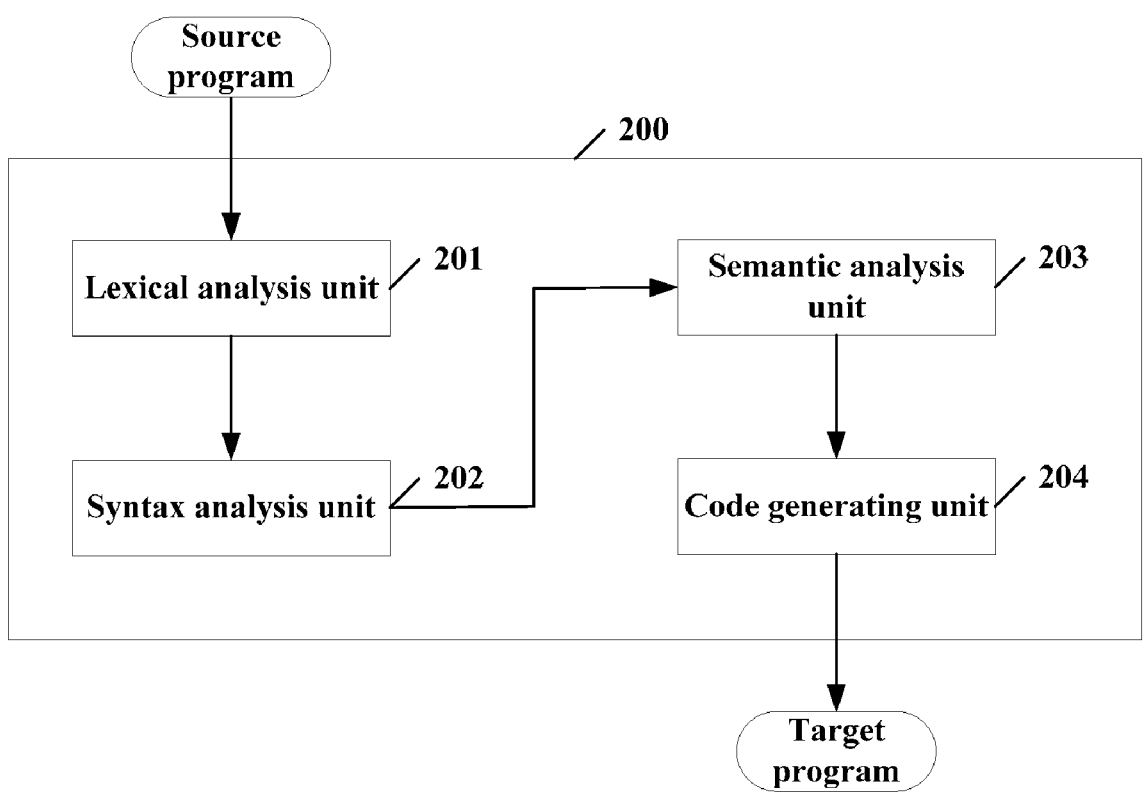
FIG. 2 is a block diagram showing a compiler of compiling a source program according to another embodiment of the present invention.

Under the same inventive conception, FIG. 2 is a block diagram showing a compiler of compiling a source program according to another embodiment of the present invention. Next, the present embodiment will be described in conjunction with FIG. 2. For those same parts as the above embodiments, the description of which will be appropriately omitted.

As shown in FIG. 2, the compiler 200 of this embodiment comprises a lexical analysis unit 201 configured to lexical analyze the source program; a syntax analysis unit 202 configured to syntax analyze the source program; a semantic analysis unit 203 configured to semantic analyze the source program; and a code generating unit 204 configured to generate a target code.

In this embodiment, the source program is any program written by using a high-level language. The high-level language has no relation with specific computer hardware and is a program design language problem-objected, the expression way of which is close to a natural language and a mathematical language and is easy to be accepted and mastered by people. In this embodiment, a language for writing the source program is required to support SIMD, such as GCC (GNU), Intel/C/C++, IBM XLC, MS Visual C++ and so on.

In this embodiment, various characters such as identifiers, constants, reserved words and operands etc. in the source program are scanned from left to right by the lexical analysis unit 201, and symbols and terms forming the source program will be transmitted to the syntax analysis unit 202. In this embodiment, any lexical analysis unit known in the art or developed in the future can be used, and the present invention has no special limitation on this.

Whether each of the sentences of which the program is composed is correct in syntax or not☐is identified by the syntax analysis unit 202 after the process of lexical analyzing the source program is completed by the lexical analysis unit 201. For a syntax error found in the analysis, an indication will be given in a way of screen displaying or words printing etc., and it is required to be modified by a programmer.

In this embodiment, a hint related to vector aligning is identified when the source program is syntax analyzed by the syntax analysis unit 202. The above-mentioned hint related to vector aligning is introduced by the programmer when writing the above-mentioned source program, and the hint is used to indicate that the vector is vector aligned. Thereby, it can be definitely known in the compiling process of the source program that the vector is a vector aligned vector. For example, a modifier "_vec_align_" can be used as the hint. The detailed description can be seen in the above-mentioned Example 1 in the embodiment of the method of compiling a source program of FIG. 1, which is omitted herein.

In this embodiment, the hint related to vector aligning identified by the syntax analysis unit 202 is recorded in order to provide the indication that the vector is vector aligned for other units. Optionally, for example, the identified hint related to vector aligning can be recorded into a symbol table as an attribute of an identifier related to the vector. In the process of compiling the source program by the compiler 200, the symbol table is used to record identifiers in the source program and their various attributes, and these attributes can provide memory allotment information, type information, domain information and so on of the identifiers. For a process identifier, there is also parameter information, including the number and the type of the parameter, the combination way of the actual parameter and the formal parameter and so on. The structure of the symbol table is a kind of data structure containing records, one identifier occupies one record in the symbol table generally, and the record also has a domain of recording the attribute of the identifier besides the name domain of the identifier.

Based on the source program syntax analyzed by the syntax analysis unit 202, the source program is semantic analyzed by the semantic analysis unit 203. The semantic analysis unit 203 is used to check if the source program contains semantic errors or not, and collect types thereof to be used at the later code generating phase. Only the source program which is syntax and semantic correct can be translated into a target code. In this embodiment, any semantic analysis unit known in the art or developed in the future can be used, and the present invention has no special limitation on this.

Based on the source program semantic analyzed by the semantic analysis unit 203, a simplified code is generated by the code generating unit 204 according to the hint related to vector aligning identified by the syntax analysis unit 202. In the process of generating the code by the code generating unit 204, for the vector having the hint related to vector aligning, the code used to judge if the vector is vector aligned or not in existing technology is not required to be generated, and the code used to turn a register is also not required to be generated, thereby the code generated is hugely simplified.

In this embodiment, an operand in the vector having the above-mentioned hint related to vector aligning is only required to be directly loaded into the register by use of the simplified code generated, and the above-mentioned register loaded with the operand is directly operated, thereby the processing performance of a program is hugely improved.

Optionally, the compiler 200 of this embodiment further comprises an intermediate code generating unit configured to generate a simplified intermediate code according to the hint related to vector aligning identified by the syntax analysis unit 202 based on the source program semantic analyzed by the semantic analysis unit 203 before the simplified code is generated by the code generating unit 204. The intermediate code is a kind of intermediate language code between a source language and a target language. The intermediate code has various forms, for example, ternary form, quaternary form, converse Poland expression, tree structure and so on.

Further, the compiler 200 of this embodiment further comprises a code optimizing unit configured to process and transform the simplified intermediate code in order to generate more effective target code (for example, saving time and saving space) at the last phase after the simplified intermediate code is generated by the intermediate code generating unit.

Further, optionally, the compiler 200 of this embodiment further comprises an error handling unit configured to do error handling in the process of compiling the source program by the compiler 200 of the embodiment. An error of the source program can be discovered at each phase of compiling the source program by the compiler 200. After the error is discovered, there is specific processing on it generally, thus the compiling can be further continued to be executed, and the compiling will not be stopped as the error appears. For example, the word spelling error can be discovered in lexical analysis of the lexical analysis unit 201. The word string is checked if the syntax structure rule is satisfied or not in syntax analysis of the syntax analysis unit 202. The part which is syntax correct but contains meaningless operation is further found by the compiler in semantic analysis of the semantic analysis unit 203, such as adding two identifiers, one of which is array name and the other is process name, is allowed in syntax, but is not allowed in semantic. Various errors should be processed at the corresponding phase.

The detailed description of the compiling process of the compiler 200 can be seen in the above-mentioned embodiment of the method of compiling a source program of FIG. 1, which is omitted herein.

Further, the compiler 200 of compiling a source program of the embodiment also can be obtained by improving an existing compiler including but not limiting to GCC (GNU C Compiler), C/C++ Compiler of Intel, XLC Compiler of IBM, Visual C++ Compiler of MS and so on based on the above.

By use of the compiler 200 of compiling a source program of the embodiment, a simplified target code can be generated by using the hint related to vector aligning provided in the source program, thereby the processing capability of the program is improved hugely, time and space are saved, and the efficiency is improved.

Though a method of compiling a source program and a compiler of compiling a source program have been described in details with some exemplary embodiments, these above embodiments are not exhaustive. Those skilled in the art can make various variations and modifications within the spirit and the scope of the present invention. Therefore, the present invention is not limited to these embodiments; rather, the scope of the present invention is only defined by the appended claims.

The invention claimed is:

1. A method executable by a processor for compiling a source program comprising:
   analyzing syntactically at least one of the source program or output received from a lexical analysis unit;
   identifying a hint related to vector alignment, said hint related to vector alignment including a modifier of a vector identifier, said step of identifying performed during the step of analyzing syntactically;
   determining whether a vector is vector aligned based on said identified hint related to vector alignment; and
   generating a simplified code based on said identified hint related to vector alignment.

2. The method according to claim 1, further comprising:
   recording said identified hint related to vector alignment.

3. The method according to claim 2, wherein the step of recording includes:
   recording said identified hint related to vector alignment into a symbol table as an attribute of the vector identifier related to the vector, wherein the step of recording allows for later use of said identified hint related to vector alignment.

4. The method according to claim 1, wherein said hint related to vector alignment is introduced by a programmer when writing said source program.

5. The method according to claim 1, wherein said generated simplified code is used to:
   directly load an operand in the vector having said hint related to vector alignment into a register.

6. The method according to claim 5, wherein said generated simplified code is further used to:
   directly operate said register loaded with said operand.

7. The method according to claim 1, further comprising:
   analyzing lexically the source program before the step of analyzing syntactically.

8. The method according to claim 1, further comprising:
   analyzing semantically at least one of the source program or output received from a syntax analysis unit.

9. The method according to claim 1, wherein the hint related to vector alignment includes the modifier of the vector identifier, said modifier of the vector identifier comprising a prefix of the vector identifier.

10. The method according to claim 1, wherein the step of generating further comprises:
    generating at least one of a simplified intermediate code or a simplified target code based on said identified hint related to vector alignment, wherein the simplified intermediate code includes a type of intermediate language code between a source language and a target language.

11. A computer-readable memory device having computer-executable instructions for performing a method for compiling a source program comprising:

a syntax analysis unit configured to syntactically analyze at least one of the source program or an output from a lexical analysis unit, the syntax analysis unit further configured to:
- identify a hint related to vector alignment, said hint related to vector alignment including a modifier of a vector identifier; and
- determine whether a vector is vector aligned based on said identified hint related to vector alignment; and a code generation unit configured to generate a simplified code based on said identified hint related to vector alignment.

12. The computer-readable memory device according to claim 11, wherein said identified hint related to vector alignment is recorded.

13. The computer-readable memory device according to claim 12, wherein said identified hint related to vector alignment is recorded into a symbol table as an attribute of the vector identifier related to the vector.

14. The computer-readable memory device according to claim 11, wherein said hint related to vector alignment is introduced by a programmer when writing said source program.

15. The computer-readable memory device according to claim 11, wherein said simplified code generated by said code generating unit is used to directly load an operand in the vector having said hint related to vector alignment into a register.

16. The computer-readable memory device according to claim 15, wherein said simplified code generated by said code generating unit is further used to directly operate said register loaded with said operand.

17. The computer-readable memory device according to claim 11, further comprising:
- a lexical analysis unit configured to lexically analyze said source program and transmit an output to the syntax analysis unit.

18. The computer-readable memory device according to claim 11, further comprising:
- a semantic analysis unit configured to semantically analyze at least one of said source program or an output received from the syntax analysis unit.

19. The computer-readable memory device according to claim 11, wherein the hint related to vector alignment includes the modifier of the vector identifier, said modifier of the vector identifier comprising a prefix of the vector identifier.

20. The computer-readable memory device according to claim 11, wherein the code generation unit is further configured to:
- generate at least one of a simplified intermediate code or a simplified target code based on said identified hint related to vector alignment, wherein the simplified intermediate code includes a type of intermediate language code between a source language and a target language.

* * * * *